United States Patent
Light et al.

(10) Patent No.: US 6,437,785 B1
(45) Date of Patent: Aug. 20, 2002

(54) METHOD OF CONVEYING A RELATIONSHIP BETWEEN OBJECTS IN A SCENE

(75) Inventors: John J. Light, Hillsboro; John D. Miller, Portland; Alan B. McConkie, Gaston, all of OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/303,469

(22) Filed: Apr. 30, 1999

(51) Int. Cl.[7] .............................................. G06T 15/70
(52) U.S. Cl. ....................... 345/473; 345/474
(58) Field of Search ................................. 345/473, 474

(56) References Cited

U.S. PATENT DOCUMENTS 5,287,446 A * 2/1994 Williams et al. ............ 395/152
5,838,326 A * 11/1998 Card et al. .................. 345/355
6,215,505 B1 * 4/2001 Minami et al. ............. 345/473

* cited by examiner

*Primary Examiner*—Mark Zimmerman
*Assistant Examiner*—Lance W. Sealey
(74) *Attorney, Agent, or Firm*—Steven P. Skabrat

(57) ABSTRACT

Conveying a relationship between two objects in a scene is accomplished by selecting source and destination ends of an imaginary line between the objects in the scene, a source object being located at the source end, a destination object being located at the destination end. An image representing the destination object may be displayed near the source end of the imaginary line. The image may be animated to the location of the destination object along the imaginary line. A relationship indicator, such as a line, may also be displayed between the source object and the image as the image is animated to the destination end.

24 Claims, 3 Drawing Sheets

METHOD OF CONVEYING A RELATIONSHIP BETWEEN OBJECTS IN A SCENE

BACKGROUND

1. Field

The present invention relates generally to computer graphics and, more specifically, to information visualization in a three dimensional scene.

2. Description

Many computer programs use two dimensional (2D) or three dimensional (3D) graphics to represent objects on a computer display. In some applications, such as semantic net viewers, for example, a line may be shown on the display as connecting two objects in a scene to indicate a relationship between the objects. For example, if the application is a family genealogy program and the objects represent family members, a line between two objects might indicate a parent/child relationship. In another example, if the application is a business information management program and the objects represent company products and parts of products, a line between two objects might indicate an assembly/component relationship. These examples are representative of situations where a line or other graphical construct is used to show a relationship between the objects in a scene. The line is typically drawn when needed to indicate the relationship and deleted when it is not needed.

However, when the amount of information being represented in a scene becomes large, and the display of information becomes dynamic in nature (possibly due to user interaction with the scene or updates to the information being displayed), the user may encounter difficulty in understanding the scene. Merely displaying a new line connecting two objects may be insufficient to indicate to the user that a change in the scene has taken place. In another situation, one or more of the objects being logically connected may not be currently visible to the user on the display. Hence, because the scene is complex, the cognitive load on the user becomes large when things change in the scene. As a result, the application becomes less useful for the user in analyzing or understanding the information being presented.

Therefore, new techniques for displaying graphical information in such a way as to reduce the cognitive load of a user are needed.

SUMMARY

An embodiment of the present invention is a method of conveying a relationship between two objects in a scene. The method includes selecting source and destination ends of an imaginary line between the objects in the scene, a source object being located at the source end, a destination object being located at the destination end, displaying an image representing the destination object near the source end of the imaginary line, and animating the image to the location of the destination object along the imaginary line.

BRIEF DESCRIPTION OF THE DRAWINGS

The features and advantages of the present invention will become apparent from the following detailed description of the present invention in which.

DETAILED DESCRIPTION

An embodiment of the present invention comprises a method of conveying a relationship between objects in a 2D or 3D scene represented on a computer display. In one embodiment, animation of one object in conjunction with the display of a relationship line or other graphical construct may be used to indicate that at least one other object in the scene is identified or should be the current object of focus for the user. In one embodiment, the invention comprises a method of introducing, gracefully removing, and highlighting changes in such lines.

Reference in the specification to "one embodiment" or "an embodiment" of the present invention means that a particular feature, structure or characteristic described in connection with the embodiment is included in at least one embodiment of the present invention. Thus, the appearances of the phrase "in one embodiment" appearing in various places throughout the specification are not necessarily all referring to the same embodiment.

To improve user comprehension and increase user trust in new visual environments, such as those created by information visualization application programs or semantic net viewers, for example, objects should not just appear in their final positions after an update is made to the information being displayed. The appearance of an object in a scene is often related to other objects in the scene and the manner of the first appearance of an object can provide useful information for cognitive integration for the user. Additionally, the arrival of new objects in the scene may be overlooked by the user if they are not accompanied by some visual effect to get the user's attention or focus.

Figure 1:
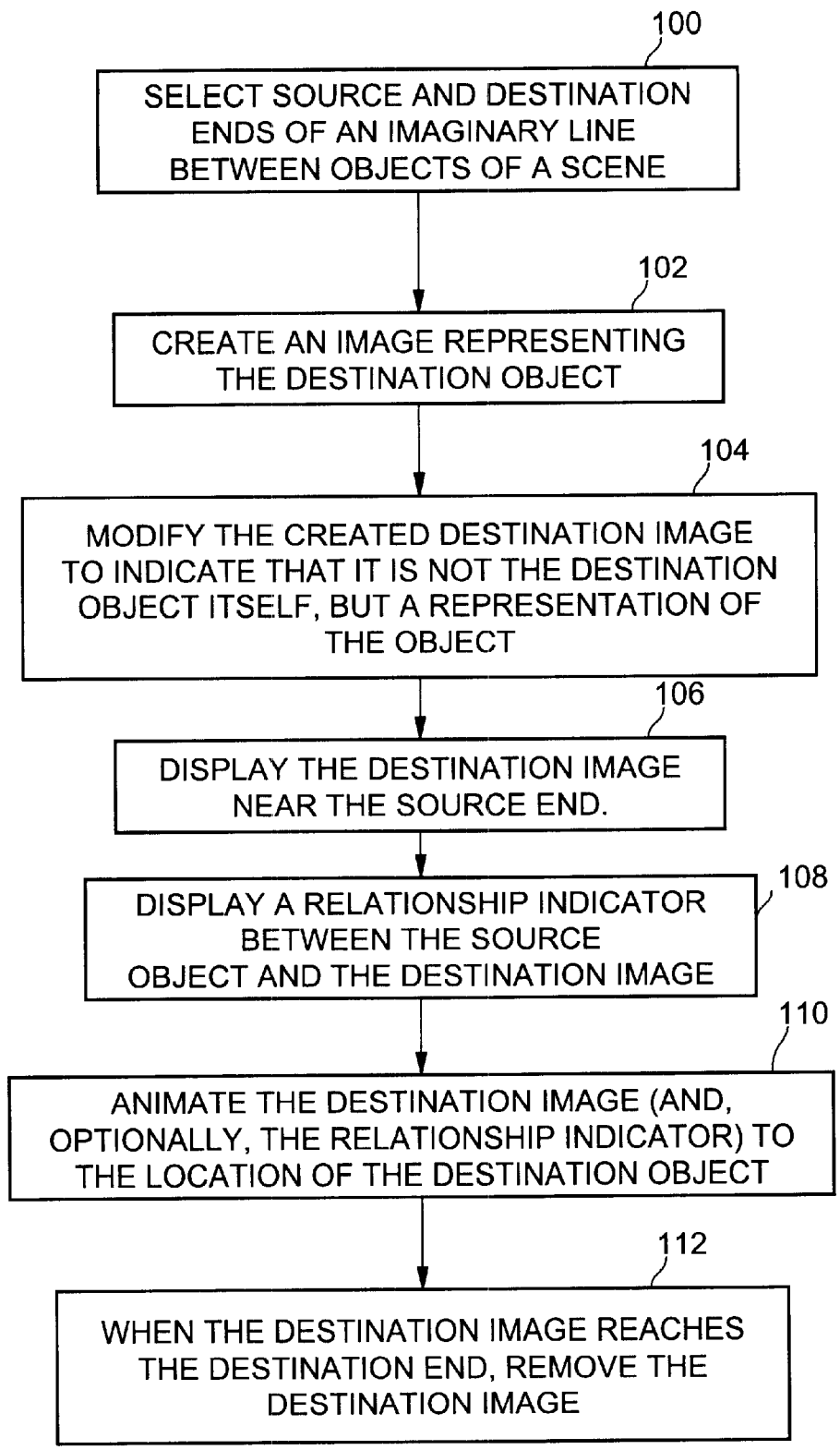
FIG. 1 is a flow diagram for animating the appearance of a new relationship in a scene according to an embodiment of the present invention.
Figure 2:
FIGS. 2, 3, and 4 are example diagrams of a changing display according to an embodiment of the present invention.

FIG. 1 is a flow diagram for animating the appearance of a new relationship in a scene according to an embodiment of the present invention. In this embodiment, the relationship may be indicated by a relationship indicator such as a line, although in other embodiments, other graphical constructs or elements may be used. At block 100, a source end and a destination end of an imaginary line between two objects of a scene may be selected. This is typically not an arbitrary choice. For example, if an operation occurs because of an action on or function of one object, this object may be chosen as the source object and the end of the line where the source object is located will be the source end. In some applications, the operation may be initiated by the user by selecting, using well known user interface methods, an object represented on the computer display. In some instances, the destination object may not be displayed until the operation on the source object is performed. Refer to FIG. 2 for an example of selecting a source object. Although the example shown in FIG. 1 uses a single destination object, in other embodiments a selection of a source object may result in displayed relationships between the selected source object and multiple destination objects (e.g., a set of 1:1 correspondences such that each member of the set comprises the relationship between the source object and a given one of the destination objects).

At block 102, an image may be created representing an object at the destination end of the imaginary line. In some embodiments, the destination image may be, for example, text from the title of the destination object, a duplicate copy of the destination object, or a generic representation of an object class that the destination object belongs to. One skilled in the art having the benefit of this disclosure will recognize that other images may also be used. At block 104, the created destination image may be modified to indicate that it is not the destination object itself, but a representation of the destination object. This may be accomplished, for example, by scaling the destination image, by making the destination image transparent, or by using colors for the destination image that are different than the destination object. Alternatively, the destination object may be initially created in such a way so that it is clear to the user that it is a representation of the destination object, and not the destination object itself.

Figure 3:
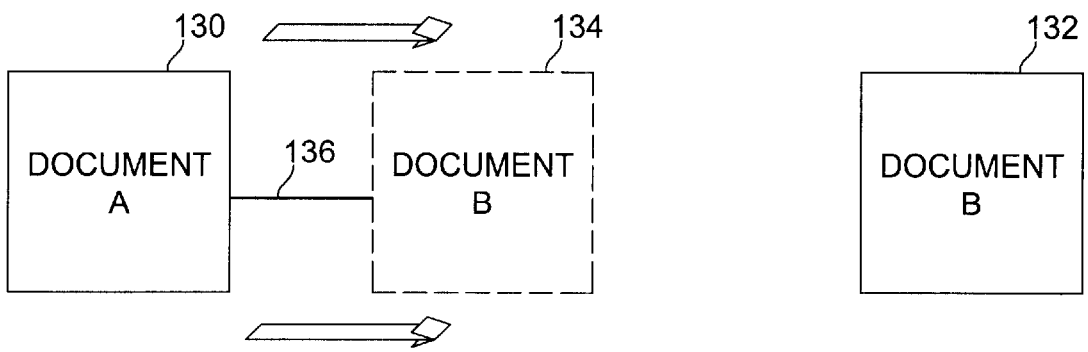

At block 106, the destination image may be displayed near the source end of the imaginary line. The exact location for placement of the destination image may be dependent on the context and complexity of the scene. For example, there may already be another representation image near the source end. However, the initial display location of the destination image should be near the source end or near a graphical user interface (GUI) control element the user activated to cause the operation to occur. At block 108, if a displayed relationship indicator (e.g., a line) or other graphical element or construct is used to indicate a relationship between the source object and the destination object, a similar line or other construct may be displayed between the source object and the destination image. In one embodiment, the complete relationship indicator may be displayed at this time. In another embodiment, only a portion of the relationship indicator may be drawn at this time, the portion extending from the source object to the current location of the destination image. At block 110, the destination image may be animated in a sequence of steps from its original display location to the location of the destination object at the destination end of the imaginary line by a linear or other purposeful path. Refer to FIG. 3 for an example of this operation. If there is a relationship indicator being displayed between the source end and the destination image, the relationship indicator may be animated as well by moving the endpoints of the indicator along the linear path. That is, the relationship indicator may be made to appear to "grow" along with the movement of the destination image towards the destination object. In other words, an existing relationship indicator may be repeatedly replaced with a new relationship indicator between the source object and the destination image as the destination image is animated along a path to the destination end.

At block 112, when the destination image reaches the destination end of the imaginary line, the destination image may be removed from the display. In one embodiment, the destination image may be finally displayed behind the destination object before deletion of the destination image. In another embodiment, the destination image may be displayed so as to appear to merge with the destination object before deletion of the destination image. If the destination object is not already displayed when the destination image arrives at the destination end, the destination image may be transformed into the destination object using well known graphical techniques. If the destination object did not already exist in the scene, the destination object may be displayed at the destination end and the destination image may be deleted. If a relationship indicator is used to connect the source object and the destination image, the relationship indicator may be deleted only if there is already an existing relationship indicator representing the same relationship between the source object and the destination object.

The result of this processing may depend on the context of the scene. If the destination object does not already exist in the scene, the result is that the destination object appears in the scene as a result of the user's interaction with the source object. In this instance, the destination image may be used as the destination object and the destination object is not deleted at the end of the operation. In this embodiment, there may be no distinction between the destination image and the destination object. That is, a newly created destination object may be animated from the source end to the destination end along with a relationship indicator.

If the destination object already exists and a relationship indicator (e.g., a line) is desired but not visible, the result is that the source object extends a visible relationship indicator to the destination object. If the destination object exists and a relationship indicator is desired and already visible, the result is to remind the user that the destination object is already in the scene and of the destination object's location without incurring the cognitive load on the user of locating, identifying, and following a static line in a complex scene. If the destination object exists and no relationship indicator is desired, one result may be that the user is reminded where the destination object already appears in the scene. In one embodiment, the processing described above may be performed in reverse for representing the closing or deletion of either the destination object or the relationship indicator connected to the destination object. In the reverse order, the destination image may be animated back to the location of the source object along the imaginary line. An existing relationship indicator may be repeatedly replaced with a new relationship indicator between the source object and the destination image as the image is animated back to the source end. Once the destination image reaches the source end, the destination image and/or the relationship indicator may be deleted.

Figure 4:
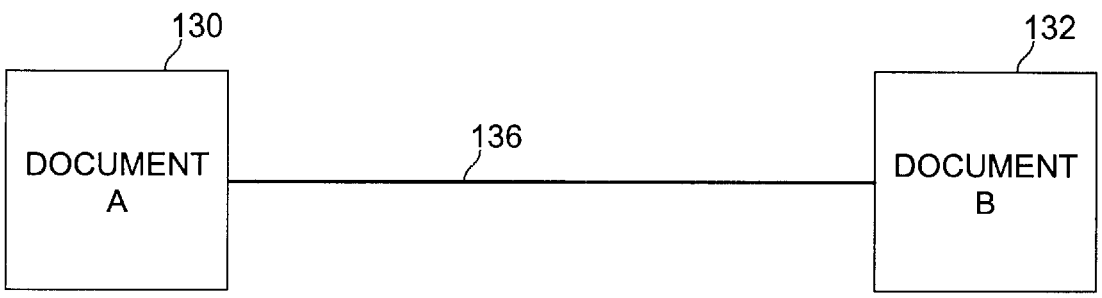

FIGS. 2, 3 and 4 are example diagrams of a changing display according to an embodiment of the present invention. In FIG. 2, a document A 130 may be selected by a user. Document A represents the source object. Document B 132 represents a destination object which in this example is already visible to the user. In FIG. 3, the selection of Document A causes a logical relationship to be exhibited between Document A and Document B. Therefore, in this embodiment an alternate representation 134 of Document B is animated as a destination image from Document A to Document B, along with a relationship indicator 136 (e.g., a line). In FIG. 4, the destination image is no longer displayed but the relationship indicator 136 remains.

In the preceding description, various aspects of the present invention have been described. For purposes of explanation, specific numbers, systems and configurations were set forth in order to provide a thorough understanding of the present invention. However, it is apparent to one skilled in the art having the benefit of this disclosure that the present invention may be practiced without the specific details. In other instances, well-known features were omitted or simplified in order not to obscure the present invention.

Embodiments of the present invention may be implemented in hardware or software, or a combination of both. However, embodiments of the invention may be implemented as computer programs executing on programmable systems comprising at least one processor, a data storage system (including volatile and non-volatile memory and/or storage elements), at least one input device, and at least one output device. Program code may be applied to input data to perform the functions described herein and generate output information. The output information may be applied to one or more output devices, in known fashion. For purposes of this application, a processing system includes any system that has a processor, such as, for example, a digital signal processor (DSP), a microcontroller, an application specific integrated circuit (ASIC), or a microprocessor.

The programs may be implemented in a high level procedural or object oriented programming language to communicate with a processing system.

The programs may also be implemented in assembly or machine language, if desired. In fact, the invention is not limited in scope to any particular programming language. In any case, the language may be a compiled or interpreted language.

The programs may be stored on a storage media or device (e.g., hard disk drive, floppy disk drive, read only memory (ROM), CD-ROM device, flash memory device, digital versatile disk (DVD), or other storage device) readable by a general or special purpose programmable processing system, for configuring and operating the processing system when the storage media or device is read by the processing system to perform the procedures described herein. Embodiments of the invention may also be considered to be implemented as a machine-readable storage medium, configured for use with a processing system, where the storage medium so configured causes the processing system to operate in a specific and predefined manner to perform the functions described herein.

Figure 5:
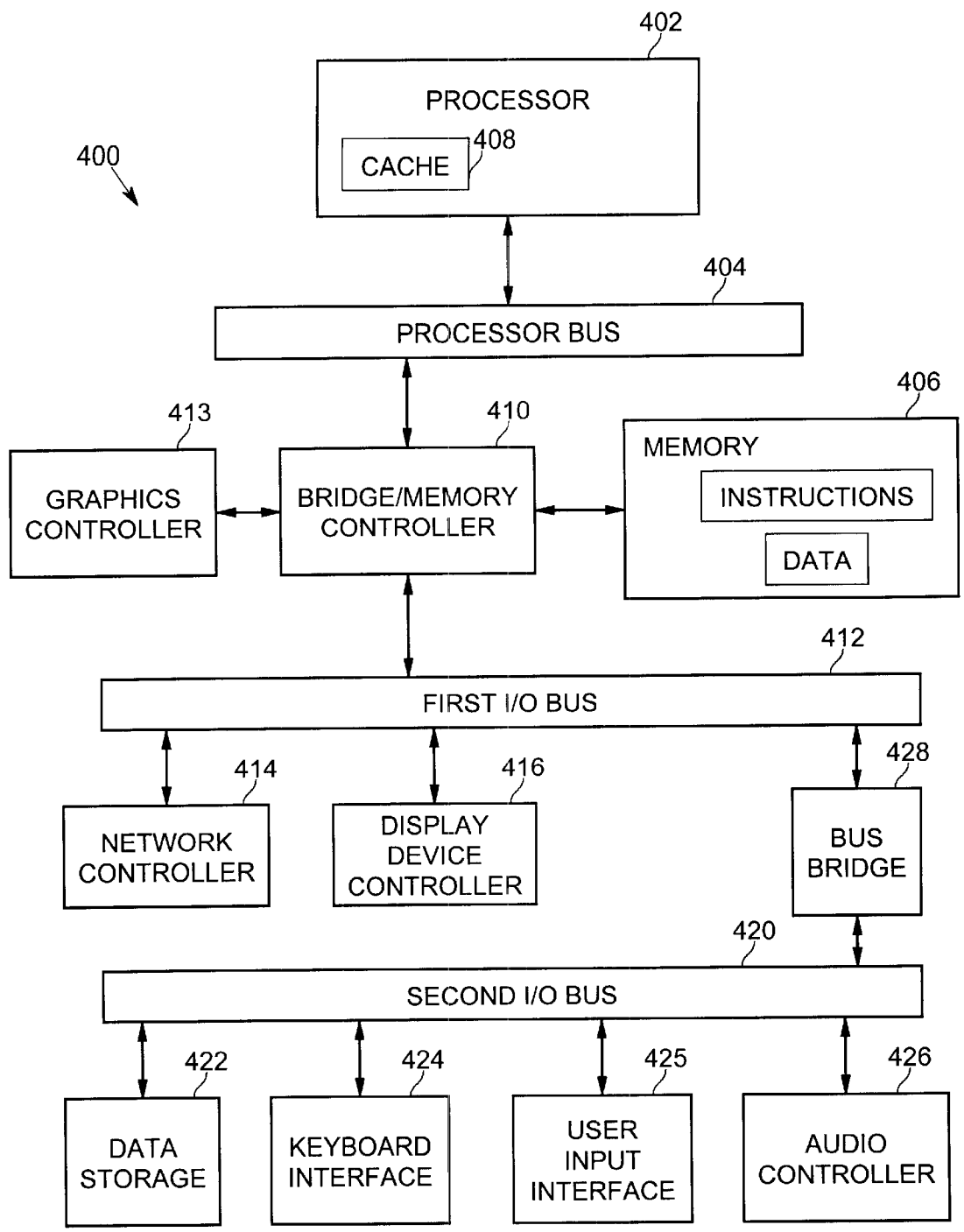
FIG. 5 is a diagram illustrating a sample system capable of being operated according to an embodiment of a method of conveying a relationship between objects in a 3D scene in accordance with the present invention.

An example of one such type of processing system is shown in FIG. 5, however, other systems may also be used and not all components of the system shown may be used for the present invention. Sample system 400 may be used, for example, to execute the processing for embodiments of a method for conveying a relationship between objects in a 3D scene, in accordance with the present invention, such as the embodiment described herein. Sample system 400 is representative of processing systems based on the PENTIUM®II, PENTIUM®III, and CELERON™ microprocessors available from Intel Corporation, although other systems (including personal computers (PCs) having other microprocessors, engineering workstations, set-top boxes and the like) may also be used. In one embodiment, sample system 400 may be executing a version of the WINDOWS® operating system available from Microsoft Corporation, although other operating systems and graphical user interfaces, for example, may also be used.

FIG. 5 is a block diagram of a system 400 of one embodiment of the present invention. The computer system 400 includes a processor 402 that processes data signals. The processor 402 may be a complex instruction set computer (CISC) microprocessor, a reduced instruction set computing (RISC) microprocessor, a very long instruction word (VLIW) microprocessor, a processor implementing a combination of instruction sets, or other processor device, such as a digital signal processor, for example. FIG. 5 shows an example of an embodiment of the present invention implemented as a single processor system 400. However, it is understood that embodiments of the present invention may alternatively be implemented as systems having multiple processors. Processor 402 may be coupled to a processor bus 404 that transmits data signals between processor 402 and other components in the system 400.

System 400 includes a memory 406. Memory 406 may be a dynamic random access memory (DRAM) device, a static random access memory (SRAM) device, or other memory device. Memory 406 may store instructions and/or data represented by data signals that may be executed by processor 402. The instructions and/or data may comprise code for performing any and/or all of the techniques of the present invention. Memory 406 may also contain additional software and/or data (not shown). A cache memory 408 may reside inside processor 402 that stores data signals stored in memory 406. Cache memory 408 in this embodiment speeds up memory accesses by the processor by taking advantage of its locality of access. Alternatively, in another embodiment, the cache memory may reside external to the processor.

A bridge/memory controller 410 may be coupled to the processor bus 404 and memory 406. The bridge/memory controller 410 directs data signals between processor 402, memory 406, and other components in the system 400 and bridges the data signals between processor bus 404, memory 406, and a first input/output (I/O) bus 412. In some embodiments, the bridge/memory controller provides a graphics port for coupling to a graphics controller 413. In this embodiment, graphics controller 413 interfaces to a display device (not shown) for displaying images rendered or otherwise processed by the graphics controller 413 to a user. The display device may comprise a television set, a computer monitor, a flat panel display, or other suitable display device.

First I/O bus 412 may comprise a single bus or a combination of multiple buses. First I/O bus 412 provides communication links between components in system 400. A network controller 414 may be coupled to the first I/O bus 412. The network controller links system 400 to a network that may include a plurality of processing systems (not shown in FIG. 5) and supports communication among various systems. The network of processing systems may comprise a local area network (LAN), a wide area network (WAN), the Internet, or other network. In some embodiments, a display device controller 416 may be coupled to the first I/O bus 412. The display device controller 416 allows coupling of a display device to system 400 and acts as an interface between a display device (not shown) and the system. The display device may comprise a television set, a computer monitor, a flat panel display, or other suitable display device. The display device receives data signals from processor 402 through display device controller 416 and displays information contained in the data signals to a user of system 400.

A second I/O bus 420 may comprise a single bus or a combination of multiple buses. The second I/O bus 420 provides communication links between components in system 400. A data storage device 422 may be coupled to the second I/O bus 420. The data storage device 422 may comprise a hard disk drive, a floppy disk drive, a CD-ROM device, a flash memory device, or other mass storage device. Data storage device 422 may comprise one or a plurality of the described data storage devices.

A keyboard interface 424 may be coupled to the second I/O bus 420. Keyboard interface 424 may comprise a keyboard controller or other keyboard interface device. Keyboard interface 424 may comprise a dedicated device or may reside in another device such as a bus controller or other controller device. Keyboard interface 424 allows coupling of a keyboard to system 400 and transmits data signals from a keyboard to system 400. A user input interface 425 may be coupled to the second I/O bus 420. The user input interface may be coupled to a user input device, such as a mouse, joystick, or trackball, for example, to provide input data to the computer system. Audio controller 426 may be coupled to the second I/O bus 420. Audio controller 426 operates to coordinate the recording and playback of audio signals. A bus bridge 428 couples first I/O bridge 412 to second I/O bridge 420. The bus bridge operates to buffer and bridge data signals between the first I/O bus 412 and the second I/O bus 420.

Embodiments of the present invention are related to the use of the system 400 to convey a relationship between objects in a 2D or 3D scene. According to one embodiment, such processing may be performed by the system 400 in response to processor 402 executing sequences of instructions in memory 404. Such instructions may be read into memory 404 from another computer-readable medium, such as data storage device 422, or from another source via the network controller 414, for example. Execution of the sequences of instructions causes processor 402 to convey a relationship between objects in a 3D scene according to embodiments of the present invention. In an alternative embodiment, hardware circuitry may be used in place of or in combination with software instructions to implement embodiments of the present invention. Thus, the present invention is not limited to any specific combination of hardware circuitry and software.

The elements of system 400 perform their conventional functions wellknown in the art. In particular, data storage device 422 may be used to provide long-term storage for the executable instructions and data structures for embodiments of methods of conveying a relationship between objects in a 2D or 3D scene in accordance with the present invention, whereas memory 406 is used to store on a shorter term basis the executable instructions of embodiments of the methods for conveying a relationship between objects in a 2D or 3D scene in accordance with the present invention during execution by processor 402.

While this invention has been described with reference to illustrative embodiments, this description is not intended to be construed in a limiting sense. Various modifications of the illustrative embodiments, as well as other embodiments of the invention, which are apparent to persons skilled in the art to which the inventions pertains are deemed to lie within the spirit and scope of the invention.

What is claimed is:

1. A method comprising:
    selecting source and destination ends of and imaginary line between two objects in a scene, a source of object being located at the source end and a destination object being located at the destination end;
    displaying an image representing the destination object near the source end of the imaginary line, the image representing the destination object being different in appearance than the destination object;
    animating the image to the location of the destination object along the imaginary line; and
    displaying a relationship indicator between the source object and the image as the image is animated, thereby communicating existence of a logical relationship between the two objects to a user.

2. The method of claim 1, wherein the relationship indicator comprises a line.

3. The method of claim 1, further comprising removing the relationship indicator when the image reaches the destination end.

4. The method of claim 1, further comprising modifying the image to indicate that the image is a representation of the destination object.

5. The method of claim 4, wherein modifying the image comprises at least one of scaling the image and making the image transparent.

6. The article of claim 4, wherein modifying the image comprises at least one of scaling the image and making the image transparent.

7. The method of claim 1, further comprising removing the image when the image reaches the destination end.

8. The method of claim 1, further comprising animating the image back to the location of the source object along the imaginary line.

9. The method of claim 8, further comprising repeatedly replacing an existing relationship indicator with a new relationship indicator between the source object and the image as the image is animated back to the source end.

10. The method of claim 8, further comprising deleting the image when the image reaches the source end.

11. The method of claim 9, further comprising deleting the relationship indicator when the image reaches the source end.

12. An article comprising: a machine readable medium having a plurality of machine readable instructions, wherein when the instructions are executed by a processor, the instructions communicate existence of a logical relationship between two objects in a scene to a user by selection source and destination ends of an imaginary line between the two objects in the scene, a source object being located at the source end, a destination object being located at the destination end, by displaying an image representing the destination object near the source end of the imaginary line, and by animating the image to the location of the destination object along the imaginary line.

13. The method of claim 1, wherein the image representing the destination object comprises a generic representation of an object class that the destination object belongs to.

14. An article comprising: a machine readable medium having a plurality of machine readable instructions, wherein when the instructions are executed by a processor, the instructions communicate existence of a logical relationship between two objects in a scene to a user by selecting source and destination ends of an imaginary line between the two objects in the scene, a source object being located at the source end, a destination object being located at the destination end, by displaying an image representing the destination object near the source end of the imaginary line, the image representing the destination object being different in appearance than the destination object, by animating the image to the location of the destination object along the imaginary line; and displaying a relationship indicator between the source object and the image as the image is animated.

15. The article of claim 14, wherein the relationship indicator comprises a line.

16. The article of claim 14, further comprising instructions to remove the relationship indicator when the image reaches the destination end.

17. The article of claim 14, further comprising instructions to modify the image to indicate that the image is a representation of the destination object.

18. The article of claim 14, further comprising instructions to remove the image when the image reaches the destination end.

19. The article of claim 14, further comprising instructions to animate the image back to the location of the source object along the imaginary line.

20. The article of claim 19, further comprising instructions to repeatedly replace an existing relationship indicator with a new relationship indicator between the source object and the image as the image is animated back to the source end.

21. The article of claim 20, further comprising instructions to delete the relationship indicator when the image reaches the source end.

22. The article of claim 19, further comprising instructions to delete the image when the image reaches the source end.

23. The article of claim 14, wherein the image representing the destination object comprises text from a title of the destination object.

24. The article of claim 14, wherein the image representing the destination object comprises a generic representation of an object class that the destination object belongs to.

* * * * *

UNITED STATES PATENT AND TRADEMARK OFFICE
CERTIFICATE OF CORRECTION

PATENT NO. : 6,437,785 B1 Page 1 of 1
DATED : April 20, 2002
INVENTOR(S) : Light et al.

It is certified that error appears in the above-identified patent and that said Letters Patent is hereby corrected as shown below:

Column 8,
Line 6 to line 17, delete "12. An article comprising: a machine readable medium having a plurality of machine readable instructions, wherein when the instructions are executed by a processor, the instructions communicate existence of a logical relationship between two objects in a scene to a user by selection source an destination ends of an imaginary line between the two objects in the scene, a source object being located at the source end, destination object being located at the destination end, by displaying an image representing the destination object near the source end of the imaginary line, and by animating the image to the location of the destination object along the imaginary line.", insert -- 12. The method of claim 1, wherein the image representing the destination object comprises text from a title of the destination object. --

Signed and Sealed this

Nineteenth Day of August, 2003

JAMES E. ROGAN
*Director of the United States Patent and Trademark Office*